US007152444B2

(12) United States Patent
Matsumoto et al.

(10) Patent No.: US 7,152,444 B2
(45) Date of Patent: Dec. 26, 2006

(54) PRESS-FORMING MACHINE

(75) Inventors: Takeo Matsumoto, Atsugi (JP); Shoji Futamura, Atsugi (JP)

(73) Assignee: Hoden Seimitsu Kako Kenkyusho Co., Ltd. (JP)

( * ) Notice: Subject to any disclaimer, the term of this patent is extended or adjusted under 35 U.S.C. 154(b) by 0 days.

(21) Appl. No.: 10/550,572

(22) PCT Filed: Mar. 23, 2004

(86) PCT No.: PCT/JP2004/003968

§ 371 (c)(1),
(2), (4) Date: Sep. 21, 2005

(87) PCT Pub. No.: WO2004/091899

PCT Pub. Date: Oct. 28, 2004

(65) Prior Publication Data

US 2006/0225475 A1 Oct. 12, 2006

(30) Foreign Application Priority Data

Apr. 15, 2003 (JP) ............................ 2003-109932

(51) Int. Cl.
*B60B 15/24* (2006.01)

(52) U.S. Cl. ......................... 72/17.2; 72/389.5; 100/46

(58) Field of Classification Search .................. 100/46; 72/453.08, 453.13, 17.2, 389.5
See application file for complete search history.

(56) References Cited

U.S. PATENT DOCUMENTS 5,243,902 A * 9/1993 Plazenet ...................... 100/46
6,595,122 B1 * 7/2003 Mukai et al. ................. 100/46
2002/0170337 A1 11/2002 Futamura et al.

FOREIGN PATENT DOCUMENTS

| | | | |
|---|---|---|---|
| EP | 1 240 999 | A1 | 9/2002 |
| JP | 53-080868 | | 7/1978 |
| JP | 57-122800 | | 7/1982 |
| JP | 7-21299 | | 4/1995 |
| JP | 2002-263900 | | 9/2002 |

* cited by examiner

*Primary Examiner*—Lowell A. Larson
*Assistant Examiner*—Debra Wolfe
(74) *Attorney, Agent, or Firm*—McGlew & Tuttle, PC

(57) ABSTRACT

A press forming machine comprising driving shafts for pressing three or more respective pressure points and displacement measuring means for measuring a displacement close to the pressure point. A central driving shaft among the driving shafts has a gap (the slack) larger than those of other driving shafts between each of the driving shafts and a pressure plate. During press formation at a trial stage, a positional displacement close to each pressure point is measured by the displacement measuring means and control data is supplied to each driving source for driving a driving shaft to drive the pressure plate. Then, production press-formation is performed in accordance with the above result. Therefore, the central driving source can avoid overload by the slack of the driving shaft with the pressure plate.

8 Claims, 5 Drawing Sheets

PRESS-FORMING MACHINE

TECHNICAL FIELD

The present invention relates to a press forming machine used to form a metallic plate, particularly to a press forming machine capable of keeping a pressure plate for setting a movable mold at a desired position of a fixed mold.

BACKGROUND ART

A press forming machine is also used for punching press, drawing, stamp forging, and injection molding. A press forming machine is generally used in which one mold is fixed and the other mold is movable. A vertical press forming machine includes a lower fixed plate, a plurality of supports supported by the lower fixed plate, an upper support plate held by the supports and a pressure plate capable of reciprocating along the supports between the lower fixed plate and the upper support plate and having a forming space between the pressure plate and the lower fixed plate. A fixed mold is mounted on the lower fixed plate and a movable mold is set to the downside of the pressure plate in the forming space and a workpiece is formed between the fixed mold and the movable mold. The pressure plate is normally planar and vertically moved by a driving mechanism. It is preferable to press-form, while keeping the movable mold at a desired positional relationship with the fixed mold, for example, to press-form by moving the movable mold while keeping it horizontal. Therefore, the pressure plate is moved while being kept horizontally. The support is built so as to be thick and have a rigidity in order to prevent the pressure plate from tilting during the press-formation. However, the pressure plate or the like is bent and a tilt occurs due to the clearance of a slide portion in some cases. Therefore, it is necessary to correct a mold in order to prevent the tilt.

Moreover, because a workpiece formed through press forming has a complex shape such as a three-dimensional shape, it is found that not only the magnification of a force applied to the pressure plate is changed in accordance with progress of press-formation but also the position to which the force is applied moves in accordance with the press-formation.

When a vertical resultant force of forces working on the pressure plate is applied to the central position of the pressure plate, an angular moment for tilting the pressure plate is not created to the pressure plate. But, since the position at which the force works is moved as described above, the position and the magnitude of the angular moment are changed. Therefore, deformations of various portions of a press forming machine such as an elongation and a warp of the pressure plate, the upper support plate and the fixed plate which occur during the press-formation are changed in accordance with progress of the press-forming.

Because a descending progress of the pressure plate is changed due to a load applied to the pressure plate or deformation of the press forming machine due to the load, the positional relationship between the fixed mold and the movable mold or the pressure plate may not be horizontal. Therefore, the present inventors improved a press forming machine having a plurality of driving sources for driving a pressure plate and proposed a press forming machine capable of keeping a pressure plate horizontal by controlling the driving sources in Japanese Patent Laid-Open No. 2002-263900. In the proposed press forming machine, a pressure plate is kept horizontal by supplying a driving pulse signal having a frequency higher than a predetermined frequency to a driving source (servomotor) set to a position close to a portion whose progress is delayed on the pressure plate and supplying a driving pulse signal having a frequency lower than the predetermined frequency to a driving source whose progress is relatively advanced. However, it is found that when an overload occurs in a driving source present at the central portion of the pressure plate, a phenomenon in which the above adjustment cannot be made occurs.

In the above proposed press forming machine, when having three or more pressure points on the pressure plate among which a pressure point present at the central portion is surrounded by the pressure points present on the periphery, a driving source for driving a driving shaft set to the pressure point at the central portion may be overloaded. When forming a workpiece by holding a forming mold between the pressure plate and a fixed plate, a load larger than the load at peripheral portion is applied to the central portion of the pressure plate. Therefore, the displacement of the central portion is most delayed. Therefore, more driving pulse signals are supplied to the driving source for driving the central driving shaft, and displacements of the central portion and peripheral portion of the pressure plate are equalized to keep their horizontal state. However, the driving shaft set in the center of the pressure plate is applied to by a load larger than that applied to each of a plurality of driving shafts present at the peripheral portion, since part of a load applied to each of the driving shafts on the periphery works on the central driving shaft and a total load is applied to the central driving shaft. Therefore, it is estimated that the driving source for driving the central driving shaft is overloaded.

DISCLOSURE OF THE INVENTION

Therefore, it is an object of the present invention to provide a press forming machine capable of avoiding the overload of a driving source set to a pressure point between a plurality of pressure points or a pressure point surrounded by a plurality of pressure points and individually or separately driving each of the driving sources so as to keep a movable mold at a desired positional relationship with a fixed mold when press forming is progressed.

A press forming machine according to the present invention comprises:

a fixed plate;

a pressure plate facing the fixed plate, having a forming space between the pressure plate and the fixed plate and being capable of reciprocating;

a plurality of driving shafts for pressing the pressure plate at three or more respective pressure points distributed on the pressure plate by engaging with the pressure plate;

a plurality of driving sources for respectively driving the plurality of driving shafts;

control means for independently driving and controlling each of the plurality of driving sources; and displacement measuring means for measuring a positional displacement of the pressure plate adjacent each of the pressure points, wherein at least one pressure point (hereinafter referred to as "central pressure point") among the pressure points is set between or surrounded by other pressure points (hereinafter referred to as "peripheral pressure points"), a gap between a driving shaft engaged with the pressure plate at the central pressure point and the pressure plate is larger than a gap between a driving shaft engaged with each of the peripheral pressure points and the pressure plate, and the control means is provided with means which measures the positional displacement adjacent each of the pressure points by the displacement measuring means on each of a plurality of operation stages during a press-forming operation, detects a state in which the entire pressure plate is kept at desired displacement positions, extracts a control data for each of the plurality of driving sources to keep the entire pressure plate at the desired displacement positions, supplies the extracted control data to each of the plurality of driving sources, and individually drives the plurality of driving sources.

In the press forming machine above, it is preferable that the driving shaft engaged with the pressure plate at the central pressure point has the gap of 0.01 to 0.2 mm between the driving shaft and the pressure plate.

In the press forming machine above, the control means may be provided with means which measures a positional displacement adjacent each of the peripheral pressure points by the displacement measuring means on each of the plurality of operation stages during the press-forming operation, detects a state in which the vicinities of the peripheral pressure points are kept at a desired displacement position, extracts a control data for each of the plurality of driving sources corresponding to the peripheral pressure points to keep the vicinities of the peripheral pressure points at the desired displacement position, supplies the extracted control data to each of the plurality of driving sources, and individually drives each of the plurality of driving sources. It is preferable that the desired displacement position adjacent the peripheral pressure points is horizontal.

In the press forming machine above, the control means may be provided with means which measures a positional displacement adjacent each of the pressure points by the displacement measuring means on each of a plurality of operation stages during the press-forming operation, detects a state in which the vicinities of the peripheral pressure points are kept at a desired displacement position and a state in which the vicinity of the central pressure point is kept within a predetermined value from the desired displacement position, extracts a control data for each of the plurality of driving sources corresponding to the peripheral pressure points to keep the vicinities of the peripheral pressure points at the desired displacement position and a control data for the driving source corresponding to the central pressure point to keep the vicinity of the central pressure point within a predetermined value from the desired displacement position, supplies the extracted control data to each of the plurality of driving sources, and individually drives each of the plurality of driving sources. It is preferable that the desired displacement position adjacent the peripheral pressure points is horizontal.

BEST MODE FOR CARRYING OUT THE INVENTION

Figure 1:
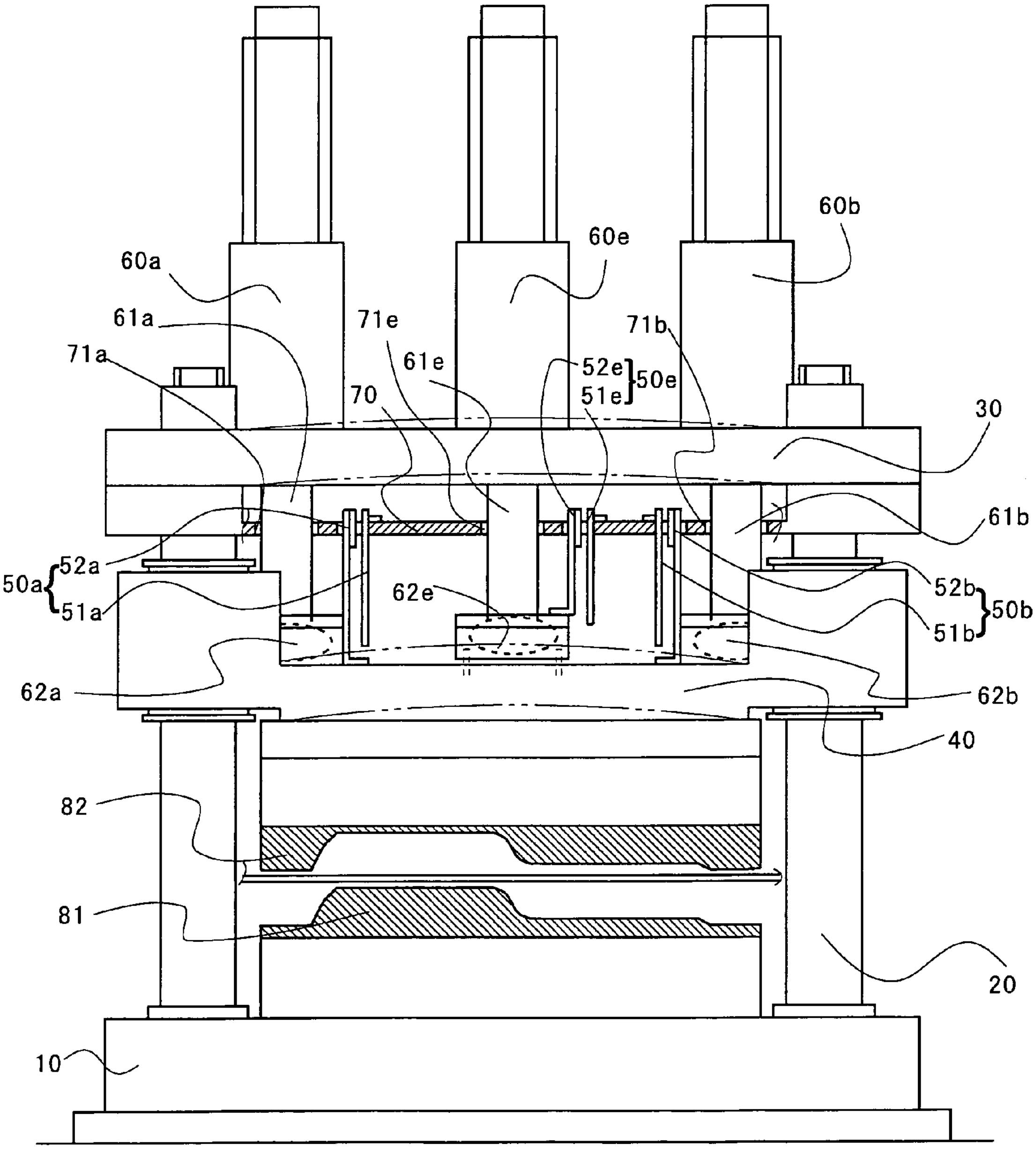
FIG. 1 is a front view of a press forming machine of an embodiment according to the present invention, which shows part of the press forming machine by a cross section.
Figure 2:
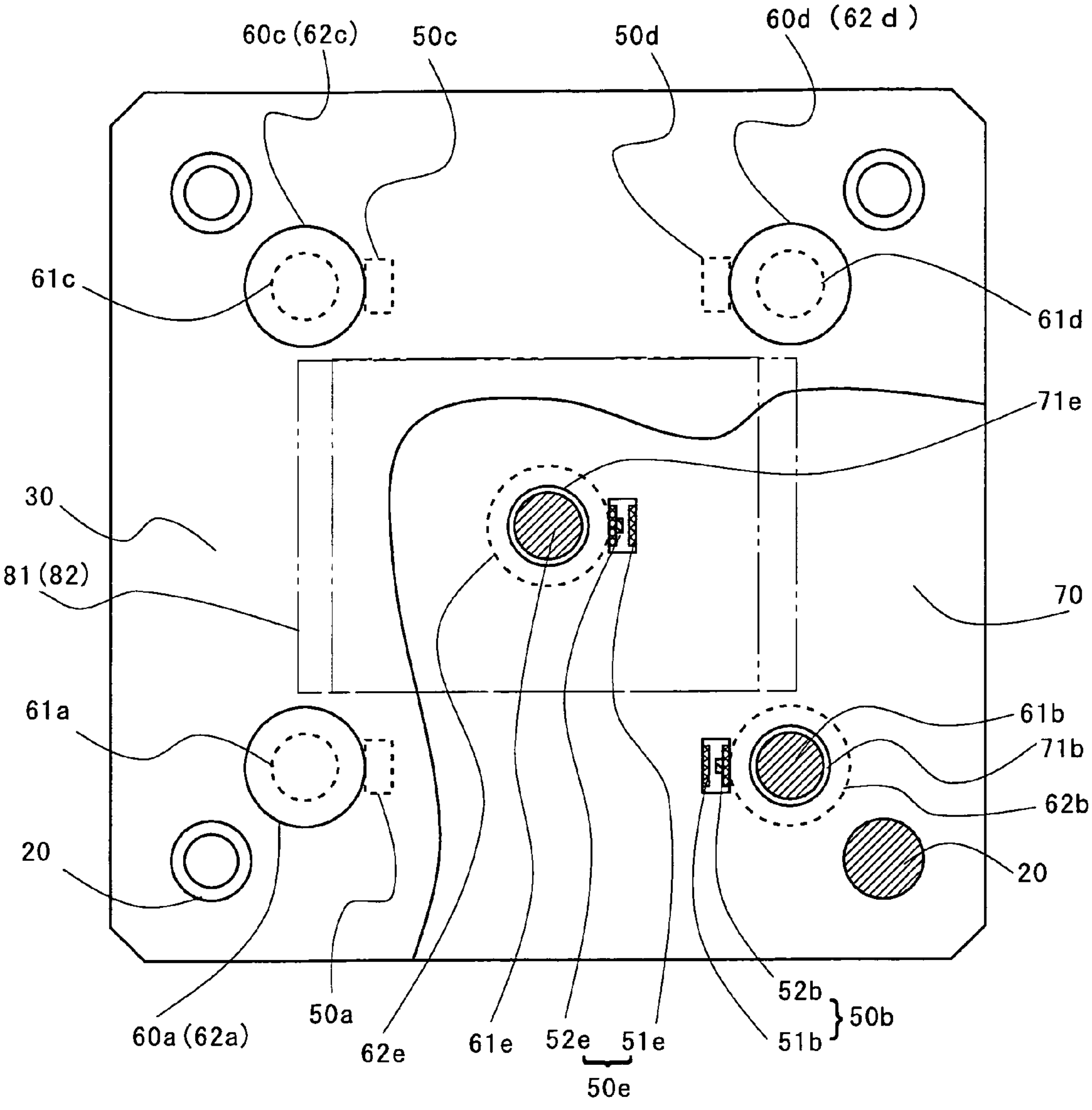
FIG. 2 is a top view of the press forming machine in FIG. 1, which shows the press forming machine by removing part of an upper support plate.
Figure 3:
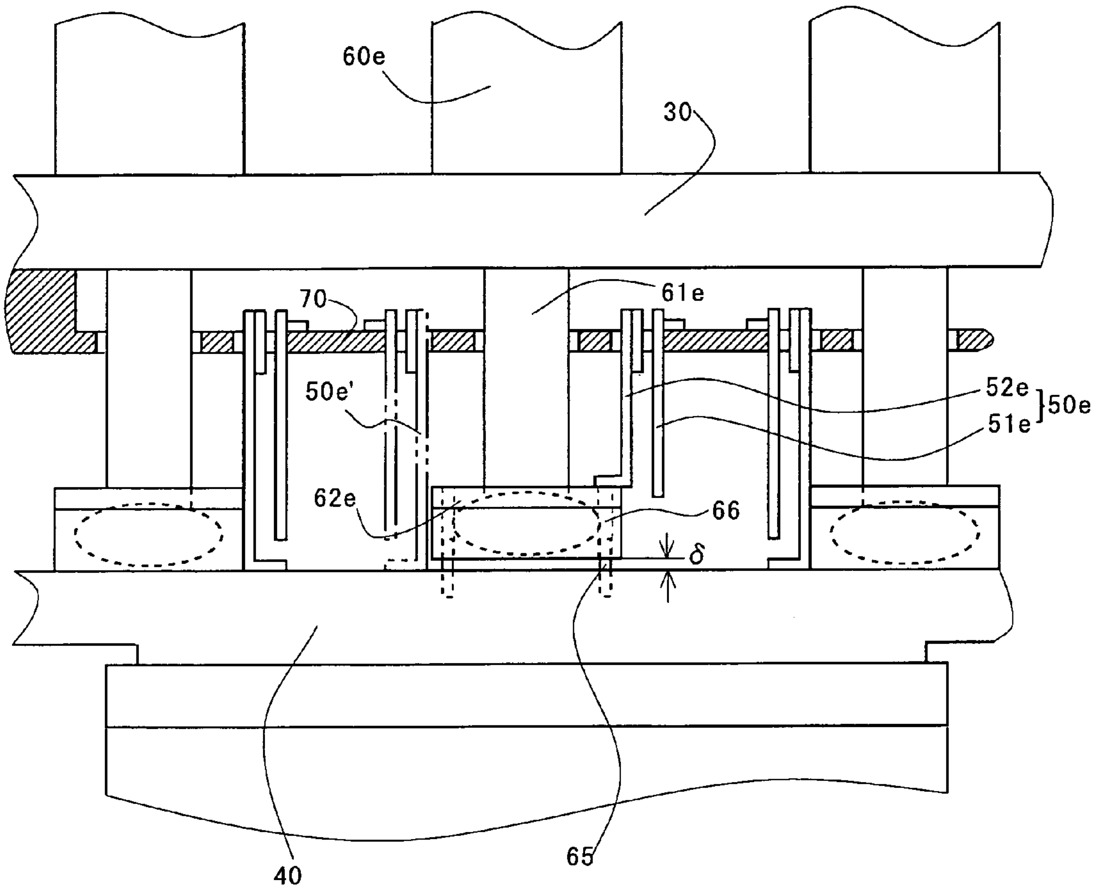
FIG. 3 is a front view shown by enlarging an essential portion of FIG. 1, which shows part of the essential portion by a cross section.

First, a press forming machine of an embodiment according to the present invention is described below by referring to FIGS. 1, 2 and 3. The press forming machine of the embodiment is a vertical press forming machine. FIG. 1 is a front view of the press forming machine of the embodiment according to the present invention, FIG. 2 is a top view of the press forming machine, and FIG. 3 is a front view shown by enlarging part of FIG. 1. FIG. 2 shows an upper support plate by removing part of the support plate. In the press forming machine, a fixed plate 10 is fixed on to the floor surface and the upper support plate 30 is held by supports 20 set to the fixed plate. A pressure plate 40 capable of reciprocating along the supports 20 is set between the fixed plate 10 and the upper support plate 30 and there is a forming space between the pressure plate and the fixed plate. A fixed mold (bottom tool) 81 for press is mounted on the fixed plate and a movable mold (top force) 82 corresponding to the fixed mold is set to the downside of the pressure plate in the forming space so as to form a plate to be formed by setting the plate between the both molds. The pressure plate 40 has sliding portions for sliding with four supports 20 at four corners of the pressure plate 40.

Five drives in which a servomotor is combined with a speed reducer are mounted on the upper support plate 30 as driving sources 60*a*, 60*b*, 60*c*, 60*d* and 60*e*. Driving shafts 61*a*, 61*b*, 61*c*, 61*d* and 61*e* extending downward from the driving sources pass through through-holes 71*a*, 71*b*, . . . , and 71*e* formed on a reference plate 70 and engage with engagement portions 62*a*, 62*b*, . . . , and 62*e* at the upside of the pressure plate 40. Each engagement portion serves as a pressure point for transmitting a pressure to the pressure plate. A ball screw is set to each of the driving shafts so as to convert rotation into vertical movement and the pressure plate is vertically moved by rotation of the servomotors. The driving sources, the driving shafts and the engagement portions constitute the drives.

It is preferable that pressure points are arranged on the pressure plate so that pressures to the pressure plate by the driving shafts 61*a*, 61*b*, 61*c*, 61*d* and 61*e* are uniformly distributed on the pressure plate. At least one pressure point among three or more pressure points is located between other pressure points or surrounded by other pressure points. It is preferable that every two pressure points among the plurality of pressure points are apart from each other with the same distance. Moreover, it is preferable that these driving sources have the same capacity of pressure, that is, the same output.

As shown by the top view in FIG. 2, the engagement portions 62*a*, 62*b*, 62*c* and 62*d* are formed at the peripheral portion of the pressure plate close to sliding portions between the pressure plate 40 and supports to surround the forming region of the forming space. Thus, the engagement portions 62*a*, 62*b*, 62*c* and 62*d* serve as peripheral pressure points. The engagement portion 62*e* surrounded by the four engagement portions 62*a*, 62*b*, 62*c* and 62*d* is formed almost in the center of the pressure plate so as to press almost the center of the forming region. Therefore, the engagement portion 62*e* serves as a central pressure point. The four engagement portions 62*a*, 62*b*, 62*c* and 62*d* on the periphery are fixed to the pressure plate 40 and gaps or slack between the driving shafts and the pressure plate are very small because the gaps are only produced by clearances between mechanical components. However, the engagement portion 62*e* formed in the center preferably has a gap of 0.01 to 0.2 mm when there is no bending between the portion 62*e* and the pressure plate. When press-formation is progressed, the reactive force to the pressure plate increases and the pressure plate 40 warps upward. Therefore, the force from the driving shaft 61*e* may be applied to the pressure plate. FIG. 3 shows a partial view enlarging the engagement portion 62*e* and the pressure plate 40. In the figure, two pins 65 are fixed on the upside of the pressure plate 40 and upper halves of the pins are protruded from the pressure plate. The pins 65 are inserted into a hole 66 opened on a block of the engagement portion 62*e* so that the block vertically moves relatively to the pins. When the driving shaft 61*e* does not press the pressure plate 40, there is a gap δ of 0.01 to 0.2 mm between the bottom of the engagement portion 62*e* and the upside of the pressure plate 40. If the pressure plate 40 is bent, the gap becomes small. When the pressure plate is further bent, the pressure plate 40 contacts the bottom of the engagement portion 62*e*. Thus, the gap serves as the slack.

Moreover, displacement measuring means 50*a*, 50*b*, 50*c*, 50*d* and 50*e* are mounted adjacent the respective engagement portions 62*a*, 62*b*, 62*c*, 62*d* and 62*e*. For each of the displacement measuring means 50*a*, 50*b*, 50*c*, 50*d* and 50*e*, it is possible to use means having a magnetic scale provided with a magnetic graduation and a magnetic sensor such as a magnetic head facing the magnetic scale with a small gap. By relatively moving the magnetic sensor against the magnetic scale, the absolute position and displacement speed of the magnetic sensor can be measured. Because the displacement measuring means is well known by those skilled in the art, further description is omitted. Also, displacement measuring means for measuring a position by light or sonic wave may be used.

Magnetic scales 51*a*, 51*b*, . . . , and 51*e* of the displacement measuring means 50*a*, 50*b*, 50*c*, 50*d* and 50*e* are mounted on the reference plate 70 and magnetic sensors 52*a*, 52*b*, . . . , and 52*e* of the displacement measuring means are supported by supports mounted on the engagement portions 62*a*, 62*b*, 62*c*, 62*d* and 62*e*. The reference plate 70 is held at the same position independently from the position of the pressure plate 40. Therefore, when the pressure plate 40 is driven by the driving sources 60*a*, 60*b*, 60*c*, 60*d* and 60*e*, displacements of the engagement portions are measured by the displacement measuring means 50*a*, 50*b*, 50*c*, 50*d* and 50*e*.

The displacement measuring means 50*e* mounted on the engagement portion 62*e* almost in the center of the pressure plate 40 does not measure a displacement of the pressure plate but it measures a displacement of the engagement portion 62*e* because a gap between the engagement portion 62*e* and the pressure plate is relatively large. It is possible to measure a displacement of the pressure plate 40 adjacent a pressure point on the pressure plate 40 by setting another displacement measuring means 50*e*' mounted adjacent the engagement portion 62*e* on the pressure plate 40 as shown by a double dotted line in FIG. 3. A difference between measured values of the two displacement measuring means 50*e* and 50*e*' becomes the slack between the engagement portion 62*e* and the pressure plate adjacent a pressure point of the engagement portion 62*e*.

The reference plate 70 is set below the upper support plate 30 and fixed between the supports 20 and has through-holes 71*a*, 71*b*, . . . , and 71*e* respectively having a sufficiently-marginal diameter at a portion through which driving shafts 61*a*, 61*b*, . . . , and 61*e* are passed so that the reference plate is not influenced by deformations of the driving shafts and the pressure plate. The upper support plate 30 and the pressure plate 40 may be deformed as shown by a double dotted line in FIG. 1 depending on the shape of a workpiece in accordance with the progress of press-formation. However, because the reference plate 70 is only supported by the supports 20 at the corners, the reference plate keeps a reference position independently from deformations of the pressure plate and the upper support plate.

The reference plate 70 is supported by the supports 20 in this embodiment. However, when it is necessary to avoid the influence of elongations of the supports 20, it is possible to set another support to a lower support or fixed plate and support the reference plate.

Figure 4:
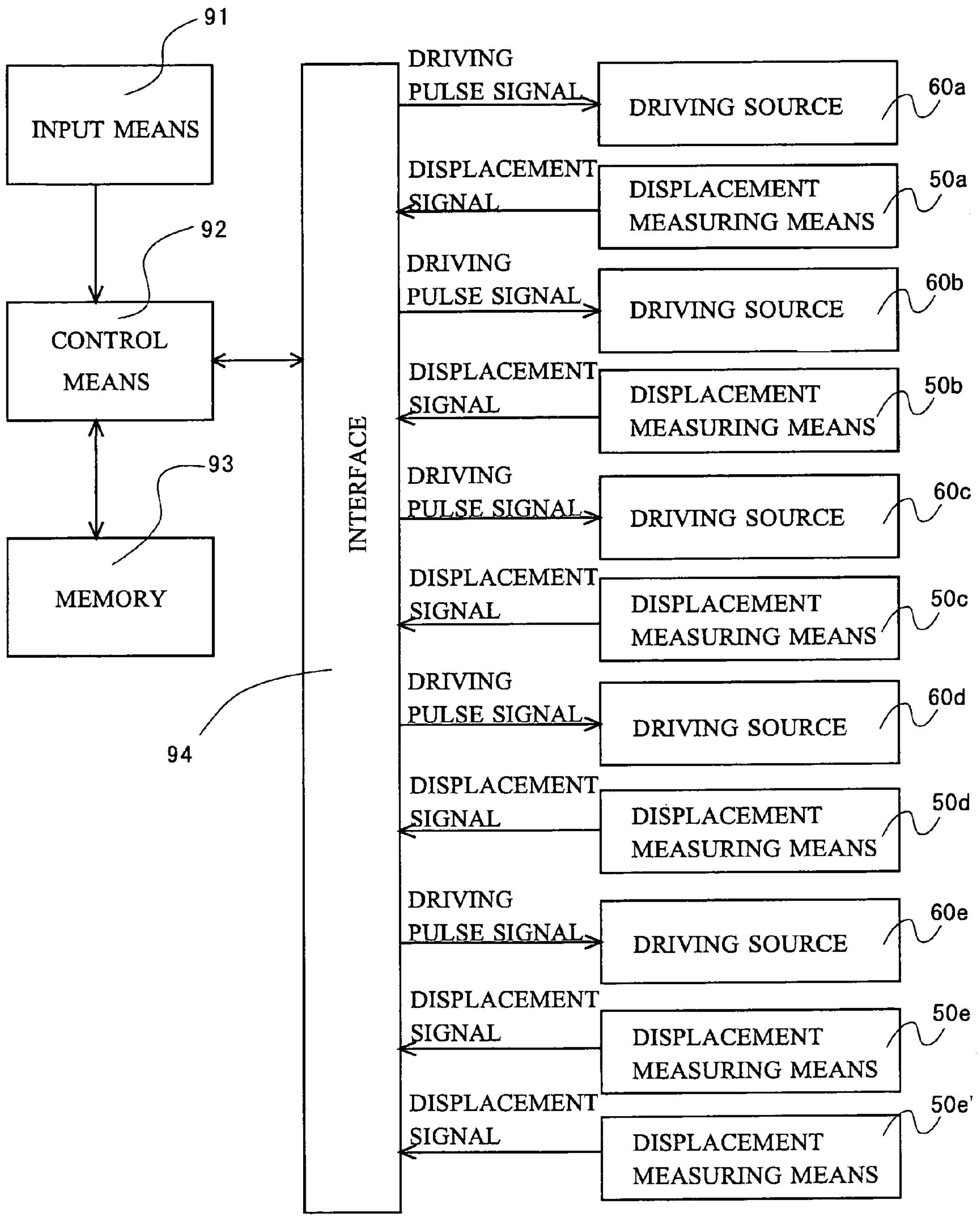
FIG. 4 shows a block diagram of a control system for the press forming machine of the embodiment of the present invention.

FIG. 4 shows a control system diagram of the press forming machine. Before starting press-formation, a product name to be formed, forming pressures, and forming time are input from input means 91 to control means 92 according to necessity in advance. The control means 92 has a CPU and driving pulse signals are sent from the control means 92 to the driving sources 60*a*, 60*b*, 60*c*, 60*d* and 60*e* through an interface 94 to drive the driving sources for press-formation. Displacement signals are sent to the control means 92 from the displacement measuring means 50*a*, 50*b*, 50*c*, 50*d* and 50*e*.

When press-formation is performed for a trial formation stage, forces working on the pressure plate are changed in accordance with progress of the press-formation. Loads to the driving sources 60*a*, 60*b*, 60*c*, 60*d* and 60*e* are changed in accordance with the change of the forces. A positional relationship between each portion of the movable mold corresponding to each driving source and the fixed mold does not become uniform. At a driving source on which a large load works, the press forming machine is deformed, particularly the pressure plate is bent, and the support is elongated. Moreover, in the case of an AC motor such as a servomotor, delay in rotation of a rotor of the motor increases and the lowering speed for lowering the pressure plate 40 is decreased. Lowering speed is relatively increased for other driving sources. The advance and delay are measured by the displacement measuring means 50*a*, 50*b*, 50*c*, 50*d*, 50*e* and 50*e*' and are sent to the control means 92 to adjust frequencies of driving pulse signals to the driving sources 60*a*, 60*b*, 60*c*, 60*d* and 60*e* so that displacements measured by the displacement measuring means 50*a*, 50*b*, 50*c*, 50*d*, 50*e* and 50*e*' become desired values, that is, parts of the pressure plate at the engagement portions become horizontal.

Thus, when forming a workpiece, control data including frequencies of driving pulse signals supplied to the driving sources is stored from the control means into a memory on each of a plurality of operation stages. In this case, the plurality of operation stages include elapsed time since the press-formation was started and lowering distance of the pressure plate or formation sequence since the press-formation was started. For example, the time until the movable mold starts pressurizing a plate to be formed after lowering the pressure plate or the moving distance until pressurizing of the plate is started is assumed as a first operation stage. When the press-formation is started after that, minute elapsed time or lowering distance (minute displacement) is assumed as a operation stage of the press-formation because control data is greatly changed.

Then, control for the press-formation is described below. Driving pulse signals are supplied to the driving sources and the pressure plate is lowered to start press-formation. When the movable mold 82 comes to hold the plate to be formed with the fixed mold 81, contacts with the most protruded portion of the mold, and starts forming the plate to be formed, the reactive force from the movable mold 82 is applied to the pressure plate. When assuming that frequencies of the driving pulse signals supplied to the driving sources are constant, loads applied to the driving sources do not become uniform when the reactive force from the plate to be formed starts applying to the pressure plate. Therefore, a driving source to which more load is applied receives larger resistance and the lowering displacement speed is decreased. However, the lowering displacement speed of a pressure point on the pressure plate corresponding to a driving source located at a portion with less load is not changed or displacement may be relatively increased. Displacement measuring means close to each of the pressure points on the pressure plate measures the displacement, returns the measured value to the control means 92, and the control means 92 adjusts the frequency of the driving pulse signal to be supplied to each driving source so as to return the pressure plate substantially to a horizontal state. The adjusted driving pulse signal is stored in the memory 93 correspondingly to each driving source in accordance with the displacement or time for each operation stage.

Figure 5A:
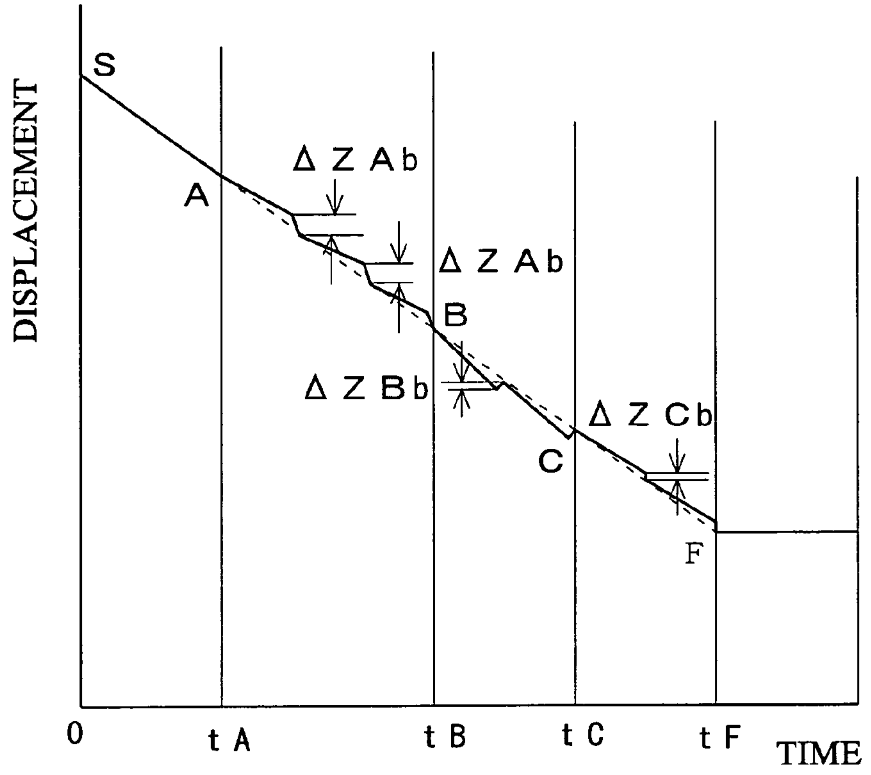
FIGS. 5A and 5B are graphs showing a relationship of a positional change (displacement) adjacent a pressure point on a pressure plates and forming time.
Figure 5B:
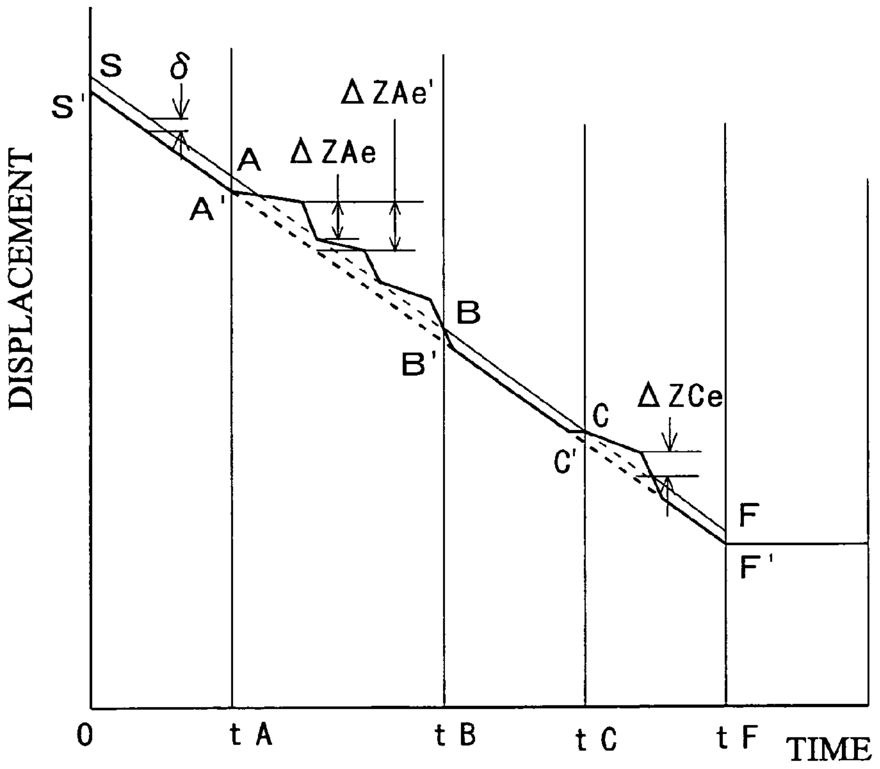

FIGS. 5A and 5B show graphs in which positional displacement close to a pressure point on the pressure plate is assigned to the axis of ordinate and forming time is assigned to the axis of abscissa. In FIGS. 5A and 5B, FIG. 5A shows displacement close to an engagement portion 62*b* as a peripheral pressure point and FIG. 5B shows displacement close to the engagement portion 62*e* as a central pressure point. Moreover, the time of start of the press-formation is assumed as S and the time of end of the press-formation is assumed as F. A dotted line connecting S and F is an arbitrary forming line (instruction value) (it is unnecessary that the dotted line is a straight line, but the dotted line may be an arbitrary curved line) and the forming line may be considered as a forming line corresponding approximately to an instruction value by which the entire pressure plate is lowering. FIG. 5A shows displacement values measured by the displacement measuring means 50*b* by a thick line. Because the pressure plate horizontally lowers until a load is applied, a straight line is formed between S and A. When application of a large load starts at the point A, the driving sources receive a large resistance, the pressure plate close to the pressure point to which the load is applied is deformed and time delay in displacement occurs, and the distance from the fixed mold relatively increases compared to other portions. Therefore, the displacement is delayed by ΔZAb from the ideal forming line predicted for the pressure point for a certain elapsed time. The displacement measuring means 50*b* close to the pressure point on the pressure plate measures the delay of the displacement, sends the measured value to the control means 92, and the control means 92 makes the frequency of the driving pulse signal to be supplied to the driving source 60*b* higher than frequency to be sent to another driving source so as to make the pressure plate return to a desired displacement. By repeating the above adjustment, the displacement is made equal to a displacement at other pressure points around the pressure plate at B.

When passing through B in FIG. 5A, the load applied to the driving source 60*b* decreases. Therefore, the displacement is accelerated by ΔZBb from the ideal forming line for a certain elapsed time. Therefore, the frequency of the driving pulse signal to be sent to the driving source 60*b* is decreased by the control means 92 so as to make the pressure plate return to a desired displacement. By repeating this adjustment, the operation reaches the press-formation end F. By applying similar controls to other driving sources 60*a*, 60*c* and 60*d* located on the periphery of the pressure plate, it is possible to form the plate to be formed, while keeping the entire pressure plate at desired displacement positions during the time of production press-formation. As a result, it is possible to prevent angular moment from occurring on the pressure plate during the production press-formation.

Similarly to FIG. 5A, FIG. 5B shows a change of displacement around the central pressure point of the pressure plate with respect to time. The displacement on the pressure plate closed to the central driving source 60*e* changes similarly to the displacement at the peripheral driving source 60*b* before a load is applied. Because the engagement portion 62*e* has the gap δ, that is, the slack between the portion 62*e* and the pressure plate, displacement of the engagement portion is present at a position by the gap δ above the displacement of the pressure point shown by a thin solid line drawn from S to A in FIG. 5B. That is, the displacement is smaller by the gap δ. After point A, if the small load continues to apply, the displacement of the engagement portion progresses along a forming line predicted for the engagement portion, as shown by a thin dotted line obtained by extending the thin solid line drawn from S to A beyond point A. The displacement of the engagement portion 62*e* is measured by the displacement measuring means 50*e* mounted on the engagement portion 62*e* that is movable relatively to the pressure plate.

In FIG. 5B, the displacement on the pressure plate is shown by a thick solid line. The displacement on the pressure plate progresses from S' to A'. After point A', if the state in which the load is small is continued, the displacement progresses along a forming line predicted for the pressure point on the pressure plate shown by a thick dotted line obtained by extending the straight thick solid line from S' to A' beyond point A'. However, a larger load is applied after point A'. The load may be larger than loads applied to pressure points on the periphery. The displacement on the pressure plate is delayed from A' due to the load. When the delay of the displacement of the pressure plate or the warped value at the central pressure point increases and the delay from the forming line predicted for the pressure plate exceeds δ, the pressure plate reaches the bottom of the engagement portion 62*e*, and the displacement intersects the thin solid line at point A. After that, the pressure by the driving source 60*e* predominantly works, and the displacement progresses with a delay identical to the delay of the engagement portion 62*e*, while the pressure plate is contacting to the engagement portion 62*e*. A delay by ΔZAe for a certain elapsed time occurs from the forming line predicted for the engagement portion 62*e*. To bring back the delay, the frequency of a driving pulse signal to be supplied to the driving source 60*e* is raised. When the load decreases and the delay or warped value of the central pressure point decreases, the displacement on the pressure plate adjacent the driving source 60*e* is restored so as to maintain the above slack. The cycles are repeated to perform the trial press-formation.

As described above, the delay ΔZAe of the engagement portion 62*e* from the forming line predicted for the engagement portion 62*e* is smaller than the delay ΔZAe' of the engagement portion 62*e* from the ideal forming line for the pressure points on the pressure plate by δ.

In the case of the graph depicted in FIG. 5A, a load of the engagement portion 62*b* is kept small between B and C. In general, like the graph in FIG. 5B, the central engagement portion 62*e* lowers so as to follow other engagement portions 62*b*, 62*c* and 62*d* on the periphery of the pressure plate while keeping the above δ in the gap. However, in some cases, as shown by the first period of C, even when the load of the engagement portion 62*b* decreases as shown in FIG. 5A and a delay ΔZCb is small, a larger load is applied to the central engagement portion 62*e*, a delay ΔZCe larger than the above gap is caused, and the driving source 60*e* may exhibit pressure.

In the first position where the bottom dead point F is reached, a pressure is applied to a pressure point corresponding to the driving source 60*e* and works so as to decrease the above gap to zero.

When the above-described gap δ is not present, it is necessary to perform control so as to create a pressure for compensating the delay ΔZAe' shown in FIG. 5B also in the central engagement portion 62*e* and the whole control may be locked or broken down because the driving source 60*e* for supplying the pressure to the central engagement portion 62*e* is undesirably overloaded. However, when the gap δ is provided as described above, it is enough to create a pressure for compensating the delay ΔZAe shown in the graph and the probability in locking or braking down the whole control is greatly decreased.

In the above embodiment, it is described that the gap δ between the engagement portion 62*e* and the pressure plate 40 is set to 0.01 to 0.2 mm. When measuring the displacement of the pressure plate adjacent an engagement portion and performing control so as to keep the horizontal state of the pressure plate, the portion at the central pressure point is warped upward by the gap δ from portions at peripheral pressure points. Therefore, it is preferable to set the magnification of the gap δ to a value allowed as a bending value of the pressure plate. The gap δ is set to the value because any trouble does not occur at each portion of a press forming machine with the gap value and because the warp capable of sufficiently showing the accuracy of a workpiece normally ranges between 0.01 and 0.2 mm.

When there is not problem even if the warp of the pressure plate increases at the portion of the central pressure point, it is also possible to perform control so that only peripheral pressure points are kept at desired displacement positions, for example, horizontally kept.

From a result of repeating the adjustment as described above, data capable of executing production press-forming is obtained.

After the data capable of executing production press-forming is gathered for each of the plurality of driving sources, the obtained data (showing the frequency of a driving source) is supplied to each of the driving sources for the production press-forming. Moreover, each driving source independently generates a pressure corresponding to the data. That is, driving is performed so as to progress from S to F as shown in FIGS. 5A and 5B.

In other words, production press-forming is performed without performing feedback control by checking a driving state among the driving sources. However, there is no temporal allowance for performing feedback control in the production press-forming.

INDUSTRIAL APPLICABILITY

As described above in detail, the press forming machine of the present invention can avoid the overload of a central driving source to which the largest load is applied and keep a desired positional relationship between a pressure plate (movable mold) and a fixed plate (fixed mold).

The invention claimed is:

1. A press forming machine comprising:

a fixed plate;

a pressure plate facing the fixed plate, having a forming space between the pressure plate and the fixed plate and being capable of reciprocating;

a plurality of driving shafts for pressing the pressure plate at three or more respective pressure points distributed on the pressure plate by engaging with the pressure plate;

a plurality of driving sources for respectively driving the plurality of driving shafts;

control means for independently driving and controlling each of the plurality of driving sources; and displacement measuring means for measuring a positional displacement of the pressure plate adjacent each of the pressure points;

wherein at least one pressure point (hereinafter referred to as "central pressure point") among the pressure points is set between or surrounded by other pressure points (hereinafter referred to as "peripheral pressure points"), a gap between a driving shaft engaged with the pressure plate at the central pressure point and the pressure plate is larger than a gap between a driving shaft engaged with each of the peripheral pressure points and the pressure plate, and the control means is provided with means which measures the positional displacement adjacent each of the pressure points by the displacement measuring means on each of a plurality of operation stages during a press-forming operation, detects a state in which the entire pressure plate is kept at desired displacement positions, extracts a control data for each of the plurality of driving sources to keep the entire pressure plate at the desired displacement positions, supplies the extracted control data to each of the plurality of driving sources, and individually drives the plurality of driving sources.

2. A press forming machine as set forth in claim 1, wherein the gap between the driving shaft engaged with the pressure plate at the central pressure point and the pressure plate ranges between 0.01 and 0.2 mm.

3. A press forming machine as set forth in claim 1, wherein the control means is provided with means which measures a positional displacement adjacent each of the peripheral pressure points by the displacement measuring means on each of the plurality of operation stages during the press-forming operation, detects a state in which the vicinities of the peripheral pressure points of the pressure plate are kept at a desired displacement position, extracts a control data for each of the plurality of driving sources corresponding to the peripheral pressure points to keep the vicinities of the peripheral pressure points at the desired displacement position, supplies the extracted control data to each of the plurality of driving sources, and individually drives each of the plurality of driving sources.

4. A press forming machine as set forth in claim 3, wherein the control means is provided with means which measures a positional displacement adjacent each of the peripheral pressure points by the displacement measuring means on each of the plurality of operation stages during the press-forming operation, detects a state in which the vicinities of the peripheral pressure points of the pressure plate are kept horizontal, extracts a control data for each of the plurality of driving sources corresponding to the peripheral pressure points, supplies the extracted control data to each of the plurality of driving sources, and individually drives each of the plurality of driving sources.

5. A press forming machine as set forth in claim 1, wherein the control means is provided with means which measures a positional displacement adjacent each of the pressure points by the displacement measuring means on each of a plurality of operation stages during the press-forming operation, detects a state in which the vicinities of the peripheral pressure points are kept at a desired displacement position and a state in which the vicinity of the central pressure point is kept within a predetermined value from the desired displacement position, extracts a control data for each of the plurality of driving sources corresponding to the peripheral pressure points to keep the vicinities of the peripheral pressure points at the desired displacement position and a control data for the driving source corresponding to the central pressure point to keep the vicinity of the central pressure point within a predetermined value from the desired displacement position, supplies the extracted control data to each of the plurality of driving sources, and individually drives each of the plurality of driving sources.

6. A press forming machine as set forth in claim 5, wherein the control means is provided with means which measures a positional displacement adjacent each of the pressure points by the displacement measuring means on each of the plurality of operation stages during the press-forming operation, detects a state in which the vicinities of the peripheral pressure points are kept horizontal and a state in which the vicinity of the central pressure point is kept within a predetermined value from a horizontal displacement position, extracts a control data for each of the plurality of driving sources corresponding to the peripheral pressure points to keep the vicinities of the peripheral pressure points horizontal and a control data for the driving source corresponding to the central pressure point to keep the vicinity of the central pressure point within the predetermined value from the horizontal displacement position, supplies the extracted control data to each of the plurality of driving sources, and individually drives each of the plurality of driving sources.

7. A press forming machine as set forth in claim 2, wherein the control means is provided with means which measures a positional displacement adjacent each of the peripheral pressure points by the displacement measuring means on each of the plurality of operation stages during the press-forming operation, detects a state in which the vicinities of the peripheral pressure points of the pressure plate are kept at a desired displacement position, extracts a control data for each of the plurality of driving sources corresponding to the peripheral pressure points to keep the vicinities of the peripheral pressure points at the desired displacement position, supplies the extracted control data to each of the plurality of driving sources, and individually drives each of the plurality of driving sources.

8. A press forming machine as set forth in claim 2, wherein the control means is provided with means which measures a positional displacement adjacent each of the pressure points by the displacement measuring means on each of a plurality of operation stages during the press-forming operation, detects a state in which the vicinities of the peripheral pressure points are kept at a desired displacement position and a state in which the vicinity of the central pressure point is kept within a predetermined value from the desired displacement position, extracts a control data for each of the plurality of driving sources corresponding to the peripheral pressure points to keep the vicinities of the peripheral pressure points at the desired displacement position and a control data for the driving source corresponding to the central pressure point to keep the vicinity of the central pressure point within a predetermined value from the desired displacement position, supplies the extracted control data to each of the plurality of driving sources, and individually drives each of the plurality of driving sources.

* * * * *